UNITED STATES PATENT OFFICE.

EPHRAIM HYDE RUST, OF BOSTON, MASSACHUSETTS.

PLASTIC CEMENT MIXTURE FOR FIRE-PROOF AND OTHER STRUCTURES.

SPECIFICATION forming part of Letters Patent No. 289,451, dated December 4, 1883.

Application filed July 10, 1883. (No specimens.)

*To all whom it may concern:*

Be it known that I, E. HYDE RUST, of Boston, county of Suffolk, State of Massachusetts, have invented an Improvement in Plastic Cement Mixtures for Fire-Proof and other Structures, of which the following is a specification.

My invention relates to an improved plastic cement mixture especially adapted for application or use in connection with heated surfaces, to protect the same and prevent the said surfaces injuriously affecting adjacent objects, the said mixture being composed of ingredients or substances which have not heretofore been combined for like purposes.

I take infusorial earth—a material very light and cellular in structure, a most excellent non-conductor of heat, but when heated to any considerable degree becoming hard and pliable—and mix with the same the material known as "talc," "agalite," or "mineral pulp," thus giving to the mixture greater strength. With this mixture I sometimes incorporate a cementitious matter—such as lime or its equivalent—and in cases where the degree of heat which is to act upon the mixture is not excessive I add as a diluent or extender paper-pulp of any usual kind, tan-bark, or sawdust, and in some cases I may, if desired, add more or less asbestus.

The mixture which I shall ordinarily use will be composed of about half and half of infusorial earth and talc, these two substances mixed together, with or without other ingredients, being of my invention. This mixture may be applied directly to the heated surfaces which are to be protected, or may be molded in shape as shells, and be applied to and bound in usual manner upon the said surfaces.

When paper-pulp or sawdust is employed in the mixture, about one-fourth of the mixture may be composed of these latter substances, and if asbestus is employed it may be added in about like proportions, all being mixed together. If lime be used, fifteen or twenty per cent. of the whole mixture may be of it.

The different materials herein mentioned are mixed dry, and water is added in sufficient quantities to bring it to the proper plastic consistency when it is to be used.

Talc possesses cementitious properties, and is at the same time a good non-conductor of heat, and works especially well with the infusorial earth, which has to have a binder. Asbestus is not at all cementitious, and when it is used with infusorial earth lime has been added to cause cohesion. Talc with infusorial earth is better than lime, because it is a better non-conductor of heat, and will, with the earth, make a harder, tougher, and more substantial body.

I disclaim as not of this invention a fire-proof material of light weight composed of infusoria (*Diatomaceæ*) and a cohesive agent; and also such a material the cohesive agent of which is a mixture of sulphuric acid, fire-clay, and asbestus; and also a heavy-weight fire-proof material composed of infusoria, (*Diatomaceæ*,) a cohesive agent, and silica; and, finally, such a material the cohesive agent of which is a mixture of sulphuric acid, asbestus, and fire-clay, combined with powdered silica, fluor or feld spar; and I further disclaim as not of this present invention a fire-proof box or safe provided with a filling of infusorial earth, and also a lining for the walls of fire-proof boxes composed of paper felting saturated with silicate of soda, and also a lining for the internal chamber of a fire-proof box or safe, the same being composed of wood saturated with silicate of soda; and, finally, a fire-proof box into the make-up of which the three several things last above mentioned enter.

I claim—

1. A plastic cement mixture composed of infusorial earth and talc, substantially as described.

2. In a plastic cement mixture, infusorial earth and talc extended by the addition of wood or other pulp, substantially as described.

In testimony whereof I have signed my name to this specification in the presence of two subscribing witnesses.

EPHRAIM HYDE RUST.

Witnesses:
 G. W. GREGORY,
 B. J. NOYES.